F. W. WOLF, Jr. & H. H. SOUTHWORTH.
VALVE CONTROL MECHANISM FOR REFRIGERATING APPARATUS.
APPLICATION FILED JAN. 16, 1912.
1,166,874. Patented Jan. 4, 1916.
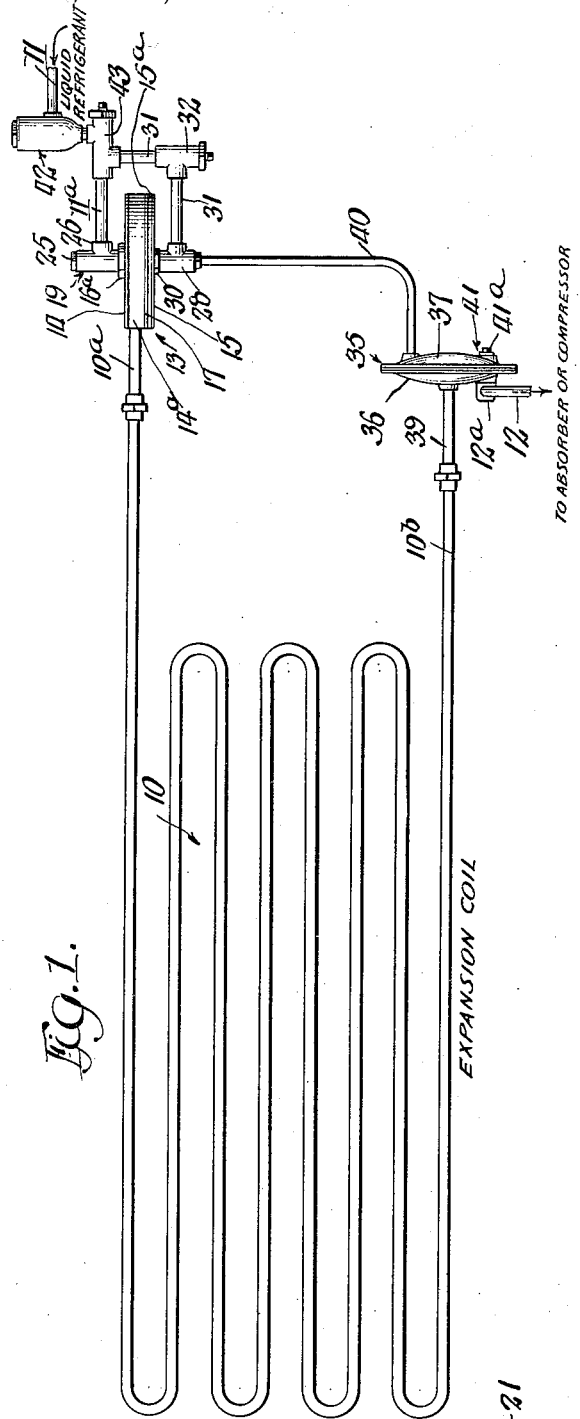
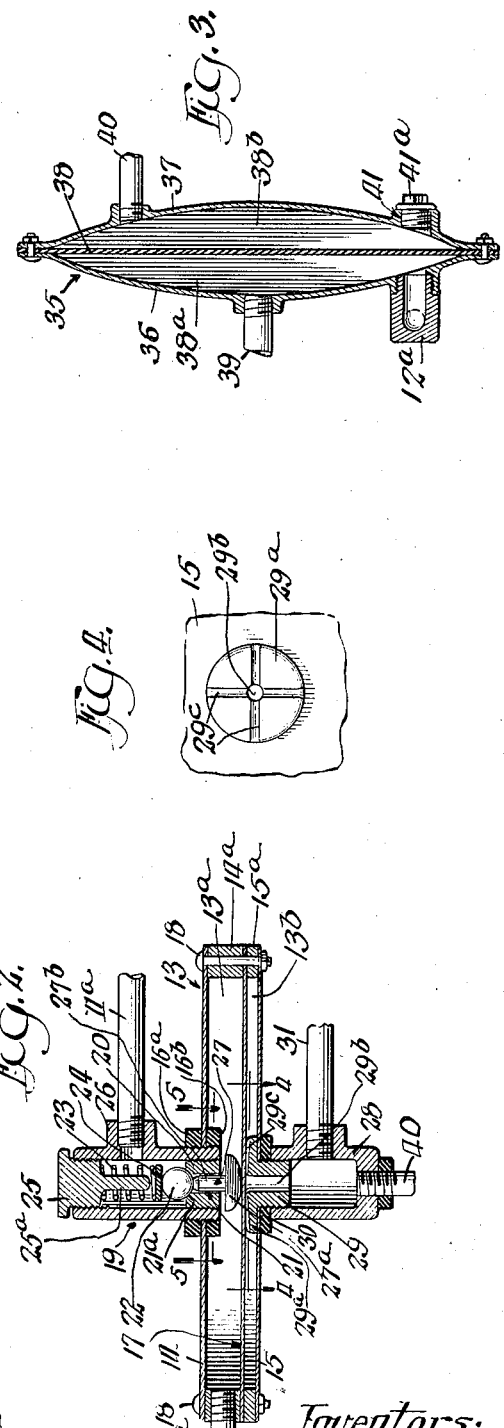
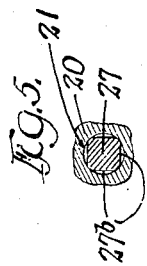
Witnesses:
J. N. Alfredo
H. R. Wilkins
Inventors:
Fred W. Wolf Jr.
Harrison H. Southworth
by Poole & Brown Attys

UNITED STATES PATENT OFFICE.

FRED W. WOLF, JR., AND HARRISON H. SOUTHWORTH, OF CLEVELAND, OHIO, ASSIGNORS, BY MESNE ASSIGNMENTS, TO THE ICELESS MACHINE COMPANY, OF CLEVELAND, OHIO, A CORPORATION OF OHIO.

VALVE-CONTROL MECHANISM FOR REFRIGERATING APPARATUS.

1,166,874. Specification of Letters Patent. Patented Jan. 4, 1916.

Application filed January 16, 1912. Serial No. 671,446.

*To all whom it may concern:*

Be it known that we, FRED W. WOLF, Jr., and HARRISON H. SOUTHWORTH, citizens of the United States, and residents of Cleveland, in the county of Cuyahoga and State of Ohio, have invented certain new and useful Improvements in Valve-Control Mechanism for Refrigerating Apparatus; and we do hereby declare that the following is a full, clear, and exact description thereof, reference being had to the accompanying drawings, and to the letters of reference marked thereon, which form a part of this specification.

This invention relates to a device for automatically controlling the supply of the refrigerating medium to the evaporating and expansion coil, or, as it is generally called, the refrigerating or freezing coil, of a refrigerating apparatus, and consists of the matters hereinafter described and more particularly pointed out in the appended claims.

As is well known, in a refrigerating apparatus, the refrigerating medium, usually ammonia, is supplied to the refrigerating coils from a receiver containing liquid ammonia under high pressure. The passage of the ammonia from the liquid receiver to the refrigerating coil is ordinarily controlled by what is usually called an expansion valve, through which the liquid ammonia is allowed to pass in small quantities. Said liquid ammonia after it has passed the valve and under the low pressure on the side of the valve toward the refrigerating coils, slowly boils, and the mixed vaporous and liquid ammonia passes into and through the refrigerating coils during the operation of the apparatus.

If, during the operation of the apparatus, the escape of ammonia through the expansion valve is cut off entirely for any substantial length of time, the ammonia in the refrigerating coil will gradually be exhausted, the vaporization and expansion of the vapor through the coil will diminish and finally cease, and the coil continuing to acquire heat from the atmosphere or other fluid surrounding it, as for example the air in the box wherein it is located, will lose less and less of this acquired heat to the ammonia passing through it, and will gradually rise in temperature. If the valve is then again opened, liquid ammonia will pass through the valve as before, and, vaporizing and expanding as it passes through the refrigerating coil, will again lower the temperature of said coil. It is thus apparent that the temperature of the surrounding medium varies with the flow of the ammonia in the coil, and therefore, having a coil of given size capable of a constant heat absorption at a predetermined rate, the temperature of the fluid or atmosphere surrounding said coil, may be accurately controlled by means of the valve which determines the flow of liquid ammonia into the expansion or refrigerating coil.

The object of our invention is to provide a mechanism for automatically controlling the valve which admits liquid ammonia to the refrigerating coil, the rate at which said ammonia is allowed to pass being determined by the temperature of the fluid surrounding said coil so that only such an amount of liquid ammonia will be allowed to pass into the coil as will maintain, by its vaporization and expansion through the coil, a certain predetermined temperature in the atmosphere or fluid surrounding the coil.

In the drawings Figure 1 is a view in side elevation showing our improved controlling device in connection with a set of expansion or refrigerating coils; Fig. 2 is a view on an enlarged scale representing a vertical section through a part of the controlling device; Fig. 3 is a view representing a vertical section through another part of the device; Fig. 4 is a fragmentary view representing a top plan of the parts below the horizontal plane of the line 4—4 of Fig. 2; Fig. 5 is a view representing a partial transverse section through Fig. 2 in a plane indicated by the line 5—5 thereof.

Referring now to that embodiment of our invention illustrated in the drawings, 10 indicates diagrammatically an expansion or refrigerating coil; 11, a pipe leading from a receiver containing liquid anhydrous ammonia under pressure (not shown); and 12 indicates a pipe adapted to lead the ammonia gas after it has done its work in the refrigerating coil back to the apparatus in which it is again converted to liquid form. 13 indicates a casing inclosing upper and lower chambers 13ª, 13ᵇ which are separated by a thin sheet metal diaphragm 17. As shown in the drawings, said casing is formed by means of upper and lower plates 14 and 15, upper and lower rings 14ª and 15ª, located one above the other between the marginal parts of said plates, and a thin sheet metal plate with its marginal parts clamped between said rings and constituting the diaphragm 17, the said plates and rings being securely bolted together in such manner as to form gas tight joints. The rings and plates are held together as shown in the drawings by means of bolts 18 which extend through the marginal parts of both upper and lower plates 14, 15, and through the rings 14ª and 15ª. The upper ring 14ª is thicker than the lower ring in order that it may have a threaded outlet aperture to receive a pipe 10ª which is connected to the inlet end of the refrigerating coil.

To the upper plate and preferably centrally thereof, is secured an upright T-fitting 19. As shown, said T-fitting is threaded at its lower end and extends through a centrally located aperture in the plate 14, and nuts 16ª and 16ᵇ, are threaded on the T-fitting with the marginal part of the plate about said central aperture engaged between them so that the T-fitting is thus rigidly secured to the plate. Within the lower end of the T-fitting is secured a valve plug 20 having a central inlet port or passage 21 and provided at its upper end with a seat 21ª to receive a ball valve 22 which closes the passage through the plug. The ball is normally held seated by means of a coiled spring 23, which bears at its lower end against a plate or disk 24 resting on top of the ball and at its other end against a threaded plug 25 which closes the upper end of the T-fitting 19. Said plug has a central, reduced stem 25ª around which the spring 23 is coiled and which serves to retain said spring in operative position.

The T-fitting is provided with a laterally opening nipple 26 into which is threaded the end of a pipe 11ª connected with the liquid ammonia supply pipe 11. The ball valve 22 is adapted to be lifted from its seat by means of a pin 27, which has vertical reciprocatory bearing within the inlet port 21 of the valve plug 20 and has a radially extending base 27ª with a rounded bottom that rests on the diaphragm 17. Said pin has one or more flat sides 27ᵇ in order to provide passages for the liquid ammonia between it and the bore of the valve plug 27.

28 indicates a T-fitting which has its upper end secured to the lower plate 15 of the casing 13. As shown in the drawings, a plug 29 is threaded into the upper end of said T-fitting 28, said plug having an annular, radially extending flange 29ª which bears against the top surface of the plate 15 and co-acts with a nut 30 secured on said plug between the upper end of the T-fitting 28 and the bottom surface of the plate 15, to rigidly secure the plug and the T-fitting to the plate 15. Said plug is provided with a port or passage 29ᵇ which opens against the diaphragm and the top of the plug has radial grooves or passages 29ᶜ which provide open passages between the port 28 and the surrounding chamber 13ᵇ below the diaphragm 17. The T-fitting 28 is connected with the pipe 11ª by a by-pass 31 in which is located a valve 32.

35 indicates a casing located below the casing 13 and comprising, as shown in the drawings, oppositely disposed concavo-convex flanged shells 36, 37 secured together at their flanges and having secured between them a metal plate 38 which has its margins clamped between the flanges of said shells. The plate 38 divides said casing into two chambers 38ª, 38ᵇ.

A pipe 39 is threaded at one end into the shell 36, preferably at its center, and is connected at its other end to the outlet end 10ᵇ of the refrigerating coil. Said pipe serves to admit the ammonia after it has passed through the refrigerating coil into the chamber 38ª of the casing 35. The pipe 12 which leads the expanded ammonia vapor back to the apparatus by means of which it is changed again to liquid form, is connected to the casing 35 by a fitting 12ª which opens into the chamber 38ª at or near its bottom. Thus the ammonia fluid, after passing through the refrigerating coils, passes through the chamber 38ª of the casing 35, in which it comes into contact with one side of the metal plate 38, after which it passes through the pipe 12 back to the apparatus by which it is reconverted into liquid form.

A pipe 40 connects the casing 35 with the T-fitting 28 which is attached to the casing 13, said pipe at its lower end being threaded into the shell 37 preferably near its top and opening into the chamber 38ᵇ which is separated by the plate 38 from the chamber that receives the ammonia from the refrigerating coils. A purge cock 41 is located near the bottom of the chamber 38ᵇ, said cock, as shown in the drawings, consisting of a plug threaded into the shell 37 and having a squared head 41ª.

Between the liquid ammonia supply pipe 11 and the pipe 11ª connected with the casing 13, is located a scale trap 42, adapted to filter out scale that might interfere with the operation of the controlling valve, and a hand valve 43 for admitting the liquid ammonia to the connecting pipe 11ª when the apparatus is started or stopped.

When in operation the chamber 38ᵇ of the casing 35, the pipe 40, and the chamber 13ᵇ of the casing 13, are filled with an expansive fluid which is susceptible of comparatively large variation of pressure under changes of temperature at or near the point of freezing water. In the preferred embodiment of our invention shown herein, we use ammonia, which, when the apparatus is being prepared for use in the first instance, is introduced into the pipe 40 by means of the by-pass 31 which is normally closed by the valve 32. The chamber 38$^b$, pipe 40 and chamber 13$^b$ may be charged with ammonia as follows: In the beginning, as there is no pressure in the chamber 13$^b$, the ball valve 22 is held closed against its seat by the spring 23. The valve 43 is opened and also the valve 32 and a small amount of liquid ammonia, under the head pressure of the liquid ammonia receiver, is allowed to pass into the pipe 40. The valve 43 is then closed and since the ammonia in the chambers 38$^b$, and 13$^b$ and the pipe 40 are under high pressure, said pressure, acting against the diaphragm 17, raises the pin 27 which lifts the ball 22 from its seat notwithstanding the pressure of the coiled spring 23. The valve 32 being still open, the ammonia passes through the pipe 31 and the pipe 11$^a$ into the T-fitting 19 whence it passes into the chamber 13$^a$ above the diaphragm and then into the refrigerating coils, the ammonia in this way carrying out the air contained in the first instance in the chambers 38$^b$ and 13$^b$ and the pipe 40, through the pipe 11$^a$, chamber 13$^a$ and the refrigerating coil 10. The valve 43 may be again opened to admit more ammonia into the pipe 40 and be again closed as above described, the operation being repeated until all the air is driven from the two said chambers and pipe, after which the valve 32 is closed and remains closed during the operation of the apparatus. In case any ammonia liquor is carried into the chambers 13$^b$, 38$^b$ and the pipe 40 with the liquid ammonia, it may be allowed to settle into the bottom of the chamber 38$^b$, from which it may be drawn by means of the purge cock 41.

When charged with thermostatic fluid the chamber 13$^b$, the pipe 40 and the chamber 38$^b$ constitute a thermostatic device having three parts, namely, a part 17 subjected to the cooling effect of the refrigerant after it passes the inlet into the casing 13; a part 38 subjected to the heating or cooling effect of refrigerant at a distance from the casing 13, and preferably at the outlet end of the refrigerating coil; and a part comprising in the example illustrated, the outer envelop of said device including the pipe 40 and the exposed walls of the chambers 13$^b$ and 38$^b$, which part is subjected to the heating effect of the fluid to be refrigerated and to be reduced to and maintained at a predetermined low temperature.

When the apparatus is ready for use, the valve 43 is opened which permits a flow of liquid ammonia into the T-fitting 19. As the casings 37 and 13 and the pipe 40 are warm in the first instance, all parts of the thermostatic device are warm, the thermostatic fluid contained therein is under a high pressure corresponding with said warm temperature, and the ball-valve 33 is upheld from its seat, the downward pressure of the spring being overbalanced by the upward pressure against the base of the stem 27 by the diaphragm 17. Liquid ammonia thus passes through the valve plug 20 along the flat sides of the stem 27 and, falling on the base 27$^a$ of said stem, is splashed over the upper surface of the diaphragm 17 whereon it vaporizes and expands and passes into the refrigerating coil. The vaporization and expansion in the chamber 13$^a$ instantly lowers the temperature of the diaphragm 17 which lowered temperature is communicated to the thermostatic fluid in the chamber 13$^b$ below said diaphragm and in the pipe 40 and chamber 38$^b$, thus producing a lower pressure in the thermostat corresponding to said temperature. The lowered pressure tends to permit the closing of the valve 22 on its seat so as to choke the inlet. Thus the heat acquired by the thermostat when the valve is closed, tends to produce a pressure condition in the thermostat acting or tending to produce a pressure to open the valve, while the opening of the valve and the admission of liquid ammonia into the chamber 13$^a$, by reason of the absorption of heat from the thermostatic fluid through the diaphragm 17, acts to produce a pressure condition in the thermostat permitting a closing movement of the valve under the action of the spring 23 to choke the inlet. The pressure of the thermostatic fluid will be affected by the temperature of the fluid to be refrigerated more quickly when it is comparatively warm and less quickly as its temperature is lowered to the desired predetermined degree of temperature at which it is intended to be maintained.

When the vaporizing refrigerant reaches the plate 38, which up to this time has been comparatively little affected by the dry ammonia gas passing through the chamber 38$^a$, and as compared to the action of the diaphragm 17, has acted as a heating agent to the thermostatic fluid, the temperature of said plate is appreciably lowered and it acts no longer to assist in raising the temperature of the thermostatic fluid but to cool it, thus adding its effect to that of the diaphragm 17 and producing a great reduction of pressure, so that the spring 23 closes the ball-valve if it be open and keeps it closed to shut off the supply of liquid ammonia to the refrigerating coil. The valve remains closed until the ammonia in the coil by heat absorption from the fluid to be refrigerated is no longer capable of vaporization at or near the plate 38, when said plate being again affected only by the temperature of the dry ammonia gas, begins to act rather as a heating agent than as a cooling agent, adding its effect to that of the part of the thermostat exposed to the fluid to be refrigerated, and the valve is opened by the pressure of the thermostatic fluid. Said valve remains open, the inlet, however, being again choked by the action of the part 17, until moist refrigerant reaches the plate 38, when the valve is again closed. As the ammonia vaporizes and expands through the refrigerating coil, a back pressure therein begins to rise and acts on the top of the plate 17 in a downward direction to reduce the resultant effect of the upward pressure exerted by the thermostatic fluid on the bottom surface of the diaphragm. The plate is thus subjected to a differential pressure which varies with the varying back pressure from the refrigerating coil and with the varying pressure of the thermostatic fluid due to its variations of temperature. If, at any time during the operation of the apparatus, the back pressure from the refrigerating coil exerted downwardly on the differential pressure member 17 added to the constant pressure of the spring 23 tending to close the valve, becomes equal to or exceeds the upward pressure exerted by the thermostatic fluid, the valve will be closed and the supply of liquid ammonia to the chamber 13ª and to the refrigerating coils will be cut off.

As will be noted the area of the part of the thermostat exposed to the influence of the temperature of the fluid to be refrigerated is comparatively large as compared to the area of the part, namely the diaphragm 17, exposed to the refrigerating action of the ammonia entering the casing, so that when the valve is open more heat will be gained by the thermostat from the fluid to be refrigerated than can be lost through the part 17. Thus the inlet, though choked by the cooling effect of the plate 17, will remain open until moist ammonia reaches the plate 38 and causes it to act as a cooling agent.

As shown herein and in the preferred form of our device, the plate 17 constitutes both a differential pressure member and a temperature affected member to communicate the temperature of the ammonia at the inlet end of the refrigerating coil to the thermostatic fluid, but manifestly our invention is not limited to this form of the device. The plate 38 acts merely as a temperature affected device for communicating the temperature of the ammonia at the outlet end of the refrigerating coil to the thermostatic fluid.

All of the factors affecting the operation of the valve are variable except the spring or other agency which acts to normally hold the valve closed. By varying the tension of the spring the temperature of the surrounding fluid or atmosphere may be determined, a light spring being used when a low temperature is desired and a heavy spring when a higher temperature is desired.

We claim—

1. A device for controlling the flow of a refrigerant to a refrigerating coil, comprising a casing having an inlet and an outlet, said refrigerating coil being connected to said outlet, a differential pressure member in said casing adapted to open and close said inlet, means coöperating with said pressure member to constitute therewith a thermostat adapted to produce a pressure acting through said differential pressure member to open said inlet, said thermostat having two parts, the first part adapted to be subjected to the cooling effect of the refrigerant in or near the casing, and the second part adapted to be subjected to the heating effect of the fluid to be refrigerated.

2. A device for controlling the flow of a refrigerant to a refrigerating coil, comprising a casing having an inlet and an outlet, said refrigerating coil being connected to said outlet, a differential pressure member in said casing adapted to control the passage of refrigerant therethrough and subjected on one side to the pressure of the refrigerant in the casing, means coöperating with said pressure member to constitute therewith a thermostat adapted to produce a pressure on the opposite side of said differential pressure member, said thermostat having two parts, the first adapted to be subjected to the cooling effect of the refrigerant in or near the casing and the second adapted to be subjected to the heating effect of the fluid to be refrigerated.

3. A device for controlling the flow of a refrigerant to a refrigerating coil, comprising a casing having an inlet and an outlet, said refrigerating coil being connected to said outlet, a motor in said casing adapted to open and close said inlet, means adapted to cause said motor to operate either in a direction to close said inlet or in a direction to open said inlet. The action of said means being controlled by the combined cooling effect of the refrigerant in or near the casing and by the heating effect of the fluid to be refrigerated and by the heating or cooling effect of the refrigerant in the coil at a place distant from the casing.

4. A device for controlling the flow of a refrigerant to a refrigerating coil, comprising a casing having an inlet and an outlet, said refrigerating coil being connected to said outlet, a motor in said casing adapted to open and close said inlet, and to be operated by the pressure of the refrigerant in the casing in a direction to close the inlet, means adapted to cause said motor to operate either in a direction to close said inlet or in a direction to open said inlet, the action of said means being controlled by the combined cooling effect of the refrigerant in or near the casing and by the heating effect of the fluid to be refrigerated and by the heating or cooling effect of the refrigerant in the coil at a place distant from the casing.

5. A device for controlling the flow of a refrigerant to a refrigerating coil, comprising a casing having an inlet and an outlet, said refrigerating coil being connected to said outlet, a differential pressure member in said casing adapted to open and close said inlet, means coöperating with said pressure member to constitute therewith a thermostat adapted to produce a pressure acting through said differential pressure member to open said inlet, said thermostat having three parts, the first part adapted to be subjected to the cooling effect of the refrigerant in or near the casing, the second part adapted to be subjected to the heating effect of the fluid to be refrigerated, and the third part adapted to be subjected to the heating effect or cooling effect of the refrigerant in the coil at a place distant from the casing.

6. A device for controlling the flow of a refrigerant to a refrigerating coil, comprising a casing having an inlet and an outlet, said refrigerating coil being connected to said outlet, a differential pressure member in said casing adapted to open and close said inlet and subjected on one side to the pressure of the refrigerant in the casing, means coöperating with said pressure member to constitute therewith a thermostat adapted to produce a pressure on the opposite side of said differential pressure member, said thermostat including three parts, the first adapted to be subjected to the cooling effect of the refrigerant in or near the casing, the second part adapted to be subjected to the heating effect of the fluid to be refrigerated, and the third part adapted to be subjected to the heating or cooling effect of the refrigerant in the coil at a place distant from the casing.

7. A device for controlling the flow of a refrigerant to a refrigerating coil, comprising a casing having an inlet and an outlet, said refrigerating coil being connected to said outlet, a differential pressure member in said casing adapted to open and close said inlet and subjected on one side to the pressure of the refrigerant in the casing, means coöperating with said pressure member to constitute therewith a thermostat adapted to produce a pressure on the opposite side of said differential pressure member, said thermostat including two parts, the first part adapted to be subjected to the cooling effect of the refrigerant in or near the casing and the second part being subjected to the heating effect of the fluid to be refrigerated, said parts being constructed so that the thermostat is influenced more by the heating effect of the second part when the inlet is open and the temperature of the fluid to be refrigerated is above a predetermined point.

8. A device for controlling the flow of a refrigerant to a refrigerating coil, comprising a casing having an inlet and an outlet, said refrigerating coil being connected to said outlet, a motor in said casing adapted to open and close said inlet and to be operated by the pressure of the refrigerant in the casing in a direction to close the inlet, means adapted to cause said motor to operate either in a direction to close said inlet or in a direction to open said inlet, the action of said means being controlled by the combined cooling effect of the refrigerant in or near the casing and by the heating effect of the fluid to be refrigerated, and by the heating or cooling effect of the refrigerant in the coil at a place distant from the casing, the direction of the operation of said motor being determined by whether said heating effects or said cooling effects predominate.

9. A device for controlling the flow of a refrigerant to a refrigerating coil, comprising a casing having an inlet and an outlet, said refrigerating coil being connected to said outlet, a differential pressure member in said casing adapted to open and close said inlet, and subjected on one side to the pressure of the refrigerant in the casing, means coöperating with said pressure member to constitute therewith a thermostat adapted to produce a pressure on the opposite side of said differential pressure member, said thermostat including three parts, the first part adapted to be subjected to the cooling effect of the refrigerant in or near the casing, the second part adapted to be subjected to the heating effect of the fluid to be refrigerated, and the third part adapted to be subjected to the heating effect or cooling effect of the refrigerant in the coil at a place distant from the casing, said parts being constructed so that the thermostat is influenced more by the heating effect of the second part, and of the third part when the inlet is open, until said third part begins to act as a cooling agent.

10. In combination with a liquid ammonia supply pipe and a refrigerating coil, a casing interposed between said supply pipe and the inlet end of said refrigerating coil, a temperature and pressure affected member dividing said casing into two chambers, one of which opens into the inlet end of said refrigerating coil, a normally closed valve adapted to control the flow of liquid ammonia into the said chamber connected with the inlet end of said refrigerating coil, means providing a substantially constant pressure acting to close said valve, a second casing adjacent the outlet end of said refrigerating coil, a temperature affected member dividing said second casing into two chambers one of which is connected with the outlet end of said refrigerating coil, and a conduit connecting the other chamber of said second casing with that chamber of the first named casing which is not connected with the refrigerating coil, said conduit and its connecting chambers being adapted to contain an expansible fluid.

11. In combination with a liquid ammonia supply pipe and a refrigerating coil, a laterally extended casing interposed between said supply pipe and the inlet end of said refrigerating coil, a temperature and pressure affected member dividing said casing into two laterally extended chambers, one of which opens into the inlet end of said refrigerating coil, a normally closed valve adapted to control the flow of liquid ammonia into the said chamber connected with said refrigerating coil, means providing a substantially constant pressure acting to close said valve, a second laterally extended casing adjacent the outlet end of said refrigerating coil, a temperature affected member dividing said second casing into two laterally extended chambers, one of which is connected with the outlet end of said refrigerating coil, and a conduit connecting the other chamber of said second casing with that chamber of the first named casing which is not connected with the refrigerating coil, said conduit and its connected chambers being adapted to contain an expansible fluid.

12. In combination with a liquid ammonia supply pipe and a refrigerating coil, a flat shallow casing interposed between said supply pipe and the inlet end of said refrigerating coil, a temperature and pressure affected member dividing said casing laterally into two chambers, one of which opens into the inlet end of said refrigerating coil, a normally closed valve adapted to control the flow of liquid ammonia into the chamber connected with said refrigerating coil, said valve being located centrally of said chamber, a stem provided with a laterally extended base adapted for opening said valve, said base resting on said temperature and pressure affected member, means providing a substantially constant pressure acting to close said valve, a second casing adjacent the outlet end of said refrigerating coil, a temperature affected member dividing said second casing into two chambers, one of which is connected with the outlet end of said refrigerating coil and a conduit connecting the other chamber of said second casing with that chamber of the first named casing which is not connected with the refrigerating coil, said conduit and its connected chambers being adapted to contain an expansible fluid.

13. A device for controlling the flow of refrigerant to a refrigerating coil comprising a casing having an inlet and an outlet, said refrigerating coil being connected to said outlet, a differential pressure member in said casing adapted to open and close said inlet, and means coöperating with said pressure member to constitute therewith a thermostat adapted to be subjected to the cooling effect of the refrigerant and the heating effect of the fluid to be refrigerated.

14. In a device for controlling the flow of a refrigerant to a refrigerating coil, the combination of a casing having an inlet and outlet, the latter of which is connected to the refrigerating coil, a differential pressure member in said casing adapted to control the passage of refrigerant through it, and means coöperating with said pressure member to constitute therewith a thermostat adapted to be subjected to the temperature of both the refrigerant and the fluid to be refrigerated and operating by pressure on the differential pressure member.

15. A device for controlling the flow of a refrigerant to a refrigerating coil comprising a thermostat having two chambers each separated by a partition, one part of one chamber being in communication with the entrance end of the expansion coil and one part of the other chamber in communication with the exit end of the expansion coil, and the other two parts of the two chambers being in communication with each other, and a valve for controlling the admission to the expansion coil under the control of the thermostat.

16. A device for controlling the flow of refrigerant to a refrigerating coil comprising a casing having a chamber therein through which liquid refrigerant may pass, a differential pressure member adapted to be acted upon by pressure in said chamber, means operated by the differential pressure member to control the passage of refrigerant to the refrigerating coil, and means coöperating with said pressure member to constitute therewith a thermostat acting on the differential pressure member and adapted to be subjected to the temperature of the refrigerant and the temperature of the fluid to be refrigerated.

17. A device for controlling the flow of refrigerant to a refrigerating coil comprising a casing having therein a differential pressure member, a chamber therein through which the liquid refrigerant may pass, means operated by the differential pressure member controlling the passage of the refrigerant, said differential pressure member being adapted to be acted upon by the pressure of the refrigerant within said chamber, and means coöperating with said pressure member to constitute therewith a thermostat acting on the differential pressure member and adapted to be subjected to the temperature of the refrigerant as it passes to the coil and as it passes away from the coil.

18. In a device for controlling the flow of refrigerant to a refrigerating coil, the combination of a casing having therein a chamber through which the refrigerant may pass, a differential pressure member forming one side of said chamber, means coöperating with said pressure member to constitute therewith a thermostat acting on the differential pressure member, and means operated by said differential pressure member to control the passage of the refrigerant through the chamber, said thermostat having means adapted to be subjected to the temperature of the refrigerant as it passes toward the coil and as it passes away from the coil and adapted to be acted upon by the temperature of the fluid to be refrigerated, said differential pressure member being also adapted to be acted upon by the pressure of the refrigerant in said chamber.

19. The combination, with an expansion coil, of a device for controlling the flow of refrigerant thereto comprising two chambers, one provided with a partition and the other with a movable diaphragm, whereby each chamber is divided into two parts, a conduit connecting one part of one chamber with one part of the other, a thermostatic fluid in said conduit, connections from the other parts of the two chambers to the two ends of the expansion coil, and a valve controlled by said diaphragm for admitting refrigerating fluid to that part of the diaphragm chamber which is connected to the expansion coil.

20. In a device for controlling the flow of refrigerant, the combination of a chamber divided by a flexible diaphragm, a second chamber divided by a partition, a conduit connecting the two chambers, an expansion coil connected with the other parts of the two chambers, a pipe adapted to supply liquid refrigerant, a valve for controlling the passage from said pipe to the diaphragm chamber which is connected with the expansion coil, a pipe from the refrigerant supply pipe to the connected space between the said diaphragm and partition, and a hand valve for controlling the pipe leading to said connecting space.

In testimony, that we claim the foregoing as our invention we affix our signatures in the presence of two witnesses, this 12th day of January A. D 1912.

FRED W. WOLF, Jr.
HARRISON H. SOUTHWORTH.

Witnesses:
CLARENCE E. MEHLHOPE,
H. A. HAUXHURST.